US008198873B2

(12) United States Patent
Young

(10) Patent No.: US 8,198,873 B2
(45) Date of Patent: Jun. 12, 2012

(54) POWER CONVERTER

(75) Inventor: George Young, Blackrock (IE)

(73) Assignee: Texas Instruments (Cork) Limited, Dublin (IE)

( * ) Notice: Subject to any disclaimer, the term of this patent is extended or adjusted under 35 U.S.C. 154(b) by 676 days.

(21) Appl. No.: 12/282,330

(22) PCT Filed: Mar. 12, 2007

(86) PCT No.: PCT/IE2007/000036
§ 371 (c)(1),
(2), (4) Date: Apr. 3, 2009

(87) PCT Pub. No.: WO2007/105189
PCT Pub. Date: Sep. 20, 2007

(65) Prior Publication Data
US 2010/0013444 A1   Jan. 21, 2010

(30) Foreign Application Priority Data

Mar. 10, 2006   (IE) ..................................... 2006/0187

(51) Int. Cl.
*G05F 1/70* (2006.01)
(52) U.S. Cl. ....................................................... 323/207
(58) Field of Classification Search .................. 323/205, 323/207, 222, 283; 363/16, 41, 95, 97, 131
See application file for complete search history.

(56) References Cited

U.S. PATENT DOCUMENTS

| | | | | |
|---|---|---|---|---|
| 4,533,986 A | * | 8/1985 | Jones ............................... | 363/17 |
| 5,134,355 A | * | 7/1992 | Hastings ........................ | 323/211 |
| 5,900,701 A | * | 5/1999 | Guhilot et al. ................. | 315/307 |
| 7,557,521 B2 | * | 7/2009 | Lys ................................ | 315/294 |
| 7,911,812 B2 | * | 3/2011 | Colbeck et al. ............. | 363/21.02 |
| 7,969,125 B2 | * | 6/2011 | Melanson ....................... | 323/222 |
| 8,014,172 B2 | * | 9/2011 | Reinberger et al. ............. | 363/16 |
| 2002/0140407 A1 | * | 10/2002 | Hwang .......................... | 323/207 |
| 2009/0129130 A1 | * | 5/2009 | Young et al. ..................... | 363/84 |

FOREIGN PATENT DOCUMENTS

| | | |
|---|---|---|
| JP | 02096413 | 4/1990 |
| WO | WO9212475 | 7/1992 |

OTHER PUBLICATIONS

PCT Search Report mailed Jun. 4, 2007.

(Continued)

*Primary Examiner* — Adolf Berhane
(74) *Attorney, Agent, or Firm* — William B. Kempler; Wade J. Brady, III; Frederick J. Telecky, Jr.

(57) ABSTRACT

This invention relates to a power converter (1) comprising a converter input (3), a converter output, a power factor pre-regulation stage (5), an isolation stage (7) and a control unit (9). The power factor pre-regulation stage (5) further comprises a buck power factor correction (PFC) circuit (15) and a bulk capacitor (25) fed by the buck PFC circuit. The amount of line current provided to the bulk capacitor (25) by the buck PFC circuit (15) may be adjusted according to the converter requirements in order to keep the voltage across the bulk capacitor (25) sufficient to ensure uniform operation of the power converter. Monitoring of the voltage across the bulk capacitor (25) and monitoring of the isolation stage (7) output current is provided to determine when additional current is to be applied to the bulk capacitor (25) and to ensure the power converter (1) operates within pre-defined parameters.

18 Claims, 1 Drawing Sheet

OTHER PUBLICATIONS

"High Performance Ripple Feedback for the Buck Unity-Power-Factor Rectifier," IEEE Transactions on Power Electronics, vol. 10, No. 2, Mar. 1995, pp. 158-163 (Lo, et al.).

Low-Cost, Low-Power, Buck-Based Input Stages Meeting the IEC1000, 3-2 Line-Current-Harmonics Limits, European Conference on Power Electronics and Applications, vol. 1, Conf. 7, pp. 1336-1341 (Kislovski).

* cited by examiner

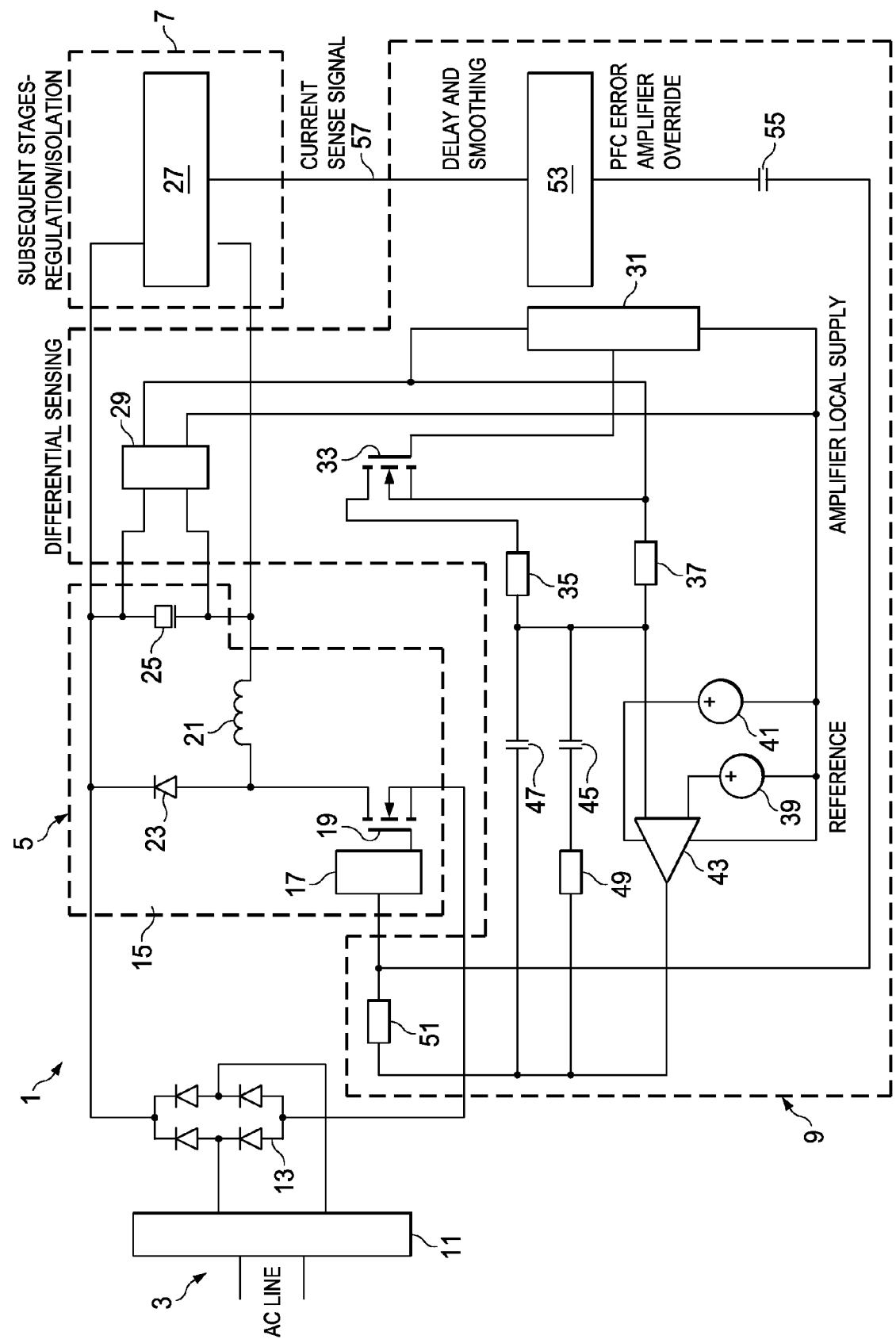

POWER CONVERTER

This invention relates to a power converter comprising a converter input, a converter output, a power factor pre-regulation stage, an isolation stage and a control unit, the power factor pre-regulation stage further comprising a buck power factor correction (PFC) circuit implemented using low side drive and low side current sensing and a bulk capacitor, the buck PFC circuit supplying current to the bulk capacitor. More specifically, this invention relates to improvements in power converter front-end circuits.

There are numerous different types and configurations of AC/DC power converters available on the marketplace. These AC/DC power converters transform the AC line voltage into a suitable DC voltage that may be used to power electronic circuits and electrical equipment. Typically, these AC/DC converters must be able to handle a wide AC voltage input range spanning Japanese low line voltage levels to European high line voltage levels. One of the more successful configurations of power converter, capable of operating in this fashion is the so-called two-stage power converter which comprises a first pre-regulation stage and then a subsequent output stage which may be an isolation stage, regulation stage, or combination of the two. Normally, the pre-regulation stage comprises a power factor pre-regulation circuit which spreads the current drawn from the AC line input across the line cycle, thereby allowing use of the power converter in countries with different supply levels. The isolation or regulation stage may thereafter operate as a DCDC converter to provide the desired level of DC voltage.

Although relatively inexpensive and efficient to implement, there are however problems associated with the known power converters and in particular the known power factor pre-regulation circuits. First of all, due to the fact that these power factor pre-regulation circuits must achieve a predictable input current performance, they must respond slowly to the input line voltage changes. Accordingly, the transient response of these power factor pre-regulation circuits is inherently quite slow and therefore these power factor pre-regulation circuits tend to have a poor response to load transients. This is seen as highly undesirable as a drop in the voltage of the bulk capacitor can often translate into a condition where a subsequent stage in the power converter will fall out of regulation and the voltage disturbance at the output of the power converter can be significant and more pronounced than was heretofore the case.

In addition to the above, these power factor pre-regulation circuits are relatively slow in responding to extra loads applied to the power converter. It is highly desirable to provide some mechanism that will allow the power converter to react to the change in output load so that it operates within predetermined limits.

It is an object therefore of the present invention to provide a power converter that overcomes at least some of the difficulties with the known constructions of power converters that is relatively simple and inexpensive to implement.

STATEMENTS OF INVENTION

According to the invention there is provided a power converter comprising a converter input, a converter output, a power factor pre-regulation stage, an isolation stage and a control unit, the power factor pre-regulation stage further comprising a buck power factor correction (PFC) circuit implemented using low side drive and low side current sensing and a bulk capacitor, the buck PFC circuit supplying current to the bulk capacitor, characterized in that the control unit comprises means to measure circuit parameters of the power converter and means to cause the buck PFC circuit to provide additional line current to the bulk capacitor in response to the measured circuit parameters of the power converter.

By having such a power converter, the control unit monitors various circuit parameters and determines when the power converter is in danger of operating outside its regulation parameters and when the control unit detects that the power converter is about to operate outside its regulation parameters, the control unit causes the buck PFC circuit to provide additional line current to the bulk capacitor. This has the direct effect of increasing the voltage across the bulk capacitor, thereby keeping the power converter within its regulation parameters. In this way, the power converter will be able to adjust quickly to any changes in the load and provide a relatively constant output from the power converter. Furthermore, by using a buck PFC stage in this manner, this is seen as a particularly useful implementation of power factor correction circuit. The buck converter may be relatively easily current limited and therefore this will allow minimization of the bulk capacitor size. By minimizing the bulk capacitor size, this provides greater or enhanced efficiency in the subsequent stages of the power converter, as well as permitting greater duty cycle in the power factor correction stage which results in lower device stresses and improved efficiency.

In another embodiment of the invention there is provided a power converter in which the control unit further comprises a loop control circuit, and the means to cause the buck PFC circuit to provide additional line current to the bulk capacitor in response to the measured circuit parameters of the power converter comprises increasing the loop gain of the loop control circuit. This is seen as a particularly simple and efficient way in which the additional line current may be supplied to the power converter bulk capacitor. The loop control circuit is simple and inexpensive to manufacture whilst being efficient to operate.

In a further embodiment of the invention there is provided a power converter in which the means to cause the buck PFC circuit to provide additional line current to the bulk capacitor by increasing the loop gain of the loop control circuit further comprises means to reduce the input resistance to the buck PFC circuit. This is seen as a particular simple way of increasing the line current to the bulk capacitor that is relatively simple to implement and furthermore uses relatively inexpensive components to achieve the goal of providing additional line current.

In one embodiment of the invention there is provided a power converter in which the means to reduce the input resistance to the buck PFC circuit further comprises a first current path having a first resistor therein, which provides a path for the current during normal operation, and a second current path having a switch and a second resistor with a resistance less that the first resistor, the switch being operable to provide the second alternative path to the current so that the current may flow through the second path thereby reducing the resistance to the buck PFC circuit. Again this is seen as a very simple and efficient manner in which to allow additional line current to be provided to the power converter bulk capacitor.

In a further embodiment of the invention there is provided a power converter in which the loop control circuit comprises an error amplifier.

In one embodiment of the invention there is provided a power converter in which the control units means to measure circuit parameters of the power converter further comprises means to measure the voltage across the bulk capacitor. By measuring the voltage across the bulk capacitor, the control unit can detect when the voltage level across the bulk capacitor is falling below acceptable levels and can take immediate action by causing additional current to be supplied to the bulk capacitor thereby increasing the voltage across the bulk capacitor. In this way, subsequent stages will remain in regulation and the power converter will operate in an improved manner.

Preferably, the control unit has means to exaggerate the response to a dip in the voltage across the bulk capacitor in order to increase the voltage across the bulk capacitor in as short a time period possible. In this way, by exaggerating the response, the voltage across the bulk capacitor will be restored and further boosted in the event of any dip in its voltage. A small dip may be indicative of a larger load being placed on the output of the power converter which will require additional voltage across the bulk capacitor in order to keep it in regulation and the converter operating as required. Therefore, the power converter will remain operating in regulation for as long as possible despite additional loads being placed on the output.

In another embodiment of the invention there is provided a power converter in which the control unit further comprises a comparator for comparing the measured value of bulk capacitor voltage against a threshold value of bulk capacitor voltage, and on the measured value falling below the threshold value, additional current is supplied to the bulk capacitor. Preferably, the threshold value of bulk capacitor voltage is a voltage marginally below the low-point associated with normal full load ripple voltage. In this way, as the power converter is about to operate outside its pre-determined regulation parameters, the additional current may be provided when needed most.

In one embodiment of the invention there is provided a power converter in which the control units means to measure circuit parameters of the power converter further comprises means to measure the current in the isolation stage output. This is seen as particularly useful as other implementations may be constrained in their effectiveness by time delays in the components used. By sensing the current in the isolation stage output, large transients of duration likely to cause an out of regulation condition may be handled in a quick and efficient manner and a fast override action is initiated by supplying additional current to the bulk capacitor. In this way, large transients may be handled effectively in the minimum time necessary keeping the power converter operating within its regulation parameters.

In another embodiment of the invention there is provided a power converter in which the means to cause the buck PFC circuit to provide additional line current to the bulk capacitor comprises providing a feedforward signal, in response to the measured value of current in the isolation stage output, to adjust the amount of line current fed to the bulk capacitor. Preferably, the control unit further comprises a delay network. It is envisaged that the delay network may comprise a low pass filter.

In a further embodiment of the invention there is provided a power converter in which the control unit is provided with timing adjustment to reduce line current distortion. By providing timing adjustment the line current distortion may be contained in an effective manner.

DETAILED DESCRIPTION OF THE INVENTION

The invention will now be more clearly understood from the following description of an embodiment thereof, given by way of example only, with reference to the accompanying drawing, in which FIG. 1 is a circuit schematic of a power converter according to the present invention.

Referring to the drawing, there is shown a power converter, indicated generally by the reference numeral 1, comprising a converter input 3, a converter output (not shown), a power factor pre-regulation stage 5, an isolation stage 7 and a control unit 9. The power converter 1 further comprises an input filter 11 and an input bridge 13. The power factor pre-regulation stage 5 comprises a buck converter 15, which in turn comprises a buck controller 17, a buck switch 19, a buck inductor 21 and a buck diode 23. The buck converter 15 feeds a bulk capacitor 25. The isolation stage 7 comprises an isolation unit 27. The control unit 9 comprises a differential sensing circuit 29, a comparator 31 and a gain adjustment switch 33. The control unit 9 further comprises a loop control circuit having a pair of resistors 35, 37, a pair of constant voltage sources 39, 41, an error amplifier 43, a pair of capacitors 45, 47 and a further pair of resistors 49, 51. The control unit 9 further comprises a low pass filter 53 and a capacitor 55.

In use, the power converter input 3 is connected to the AC line input and the AC line input is passed through the input filter 11 and the input bridge 13. The buck controller 17 operates the buck switch 19 to control the flow of current to the bulk capacitor 25. The differential sensing unit 29 measures the voltage across the bulk capacitor 25 and this value is passed to the comparator 31. The comparator 31 compares the value of voltage across the bulk capacitor 25 with a threshold voltage which is marginally less than the low point associated with normal full load ripple voltage. If it is determined that the voltage across bulk capacitor 25 is less than the threshold voltage, the comparator 31 sends a signal to the gain adjustment switch 33, provided by way of a field effect transistor (FET) and turns the FET on. When the FET is on this provides a path for current through the resistor 35 as opposed to the resistor 37 thereby reducing the overall resistance to the buck converter 15. This increases the current delivered through the buck converter 15 to the bulk capacitor 25, thereby increasing the voltage across the bulk capacitor.

Therefore, the comparator 31 is used to switch in the extra gain to the circuit. The error amplifier 43 is allowed to function at all times with the effective value of input resistance being changed by switching in a resistor in parallel to the resistor already in place using a MOSFET switch. The comparator 31 gates the MOSFET switch 33. It will be understood that when the switching is carried out current will be drawn from the line indirectly as the initial action of increasing the gain is carried out.

At the same time, transient conditions may be anticipated by monitoring the isolation stage output current and providing a feedforward signal to the adjusted line current. A current sense signal 57 is taken from the isolation stage 7 and delivered to the low pass filter 53. When a large transient of duration likely to cause an out-of-regulation condition is experienced at the isolation stage 7, caused by a change in the load, the fast override action is initiated and additional line current is sent through the buck pre-regulator stage to the bulk capacitor. In this way, the voltage across the bulk capacitor 25 may be kept sufficient to allow the power converter 1 to operate within pre-defined parameters.

Throughout this specification, the additional line current has been provided by reducing the input resistance to the buck pre-regulation stage. It will be understood however that this may be achieved in a number of different ways, but the reduction of resistance is seen as a particularly useful and simple way of implementing the increase in line current to the bulk capacitor. Furthermore, it is envisaged that the fast control method of monitoring the isolation stage output current may be implemented with or without the control loop monitoring the voltage across the bulk capacitor. By monitoring the bulk capacitor voltage, it is necessary for the bulk capacitor voltage to drop below the threshold level in order for the control mechanism to kick in. This results inevitably in a time delay as the pre-regulation stage using current mode control requires the output of the error amplifier to physically change to allow extra current to flow and there is also additional delay in charging loop components causing an inherent delay in responding to extra load. Therefore, it is possible to overcome these difficulties by also providing current sensing in the isolation stage and in the event of large transients carrying out a fast override action providing additional current to the bulk capacitor.

Furthermore, it will be understood that the invention could be carried out with other pre-regulation stage apparatus, however it is envisaged that the buck power factor correction circuit is preferred as this implementation is easily current limited and allows minimization of the bulk capacitor size. This allows for reduction in the cost of the circuitry as well as greater efficiency in the output stages and improved duty cycle in the buck converter stage which leads to reduced stresses in the devices.

In the specification the terms "comprise, comprises, comprised and comprising" and the terms "include, includes, included and including" or any variation thereof are considered to be totally interchangeable and they should all be afforded the widest possible interpretation and vice versa.

The invention is in no way limited to the embodiments hereinbefore described but may be varied in both construction and detail within the scope of the claims.

The invention claimed is:

1. A power converter comprising a converter input, a converter output, a power factor pre-regulation stage, an isolation stage and a control unit, the power factor pre-regulation stage further comprising a buck power factor correction (PFC) circuit implemented using low side drive and low side current sensing and a bulk capacitor, the buck PFC circuit supplying current to the bulk capacitor, wherein the control unit comprises means to measure circuit parameters of the power converter, means to cause the buck PFC circuit to provide additional line current to the bulk capacitor in response to the measured circuit parameters of the power converter, a loop control circuit, and the means to cause the buck PFC circuit to provide additional line current to the bulk capacitor in response to the measured circuit parameters of the power converter comprises increasing the loop gain of the loop control circuit.

2. A power converter as claimed in claim 1 in which the means to cause the buck PFC circuit to provide additional line current to the bulk capacitor by increasing the loop gain of the loop control circuit further comprises means to reduce the input resistance to the buck PFC circuit.

3. A power converter as claimed in claim 2 in which the means to reduce the input resistance to the buck PFC circuit further comprises a first current path having a first resistor therein, which provides a path for the current during normal operation, and a second current path having a switch and a second resistor with a resistance less that the first resistor, the switch being operable to provide the second alternative path to the current so that the current may flow through the second path thereby reducing the resistance to the buck PFC circuit.

4. A power converter (1) as claimed in claim 1 in which the loop control circuit comprises an error amplifier.

5. A power converter as claimed in claim 1 in which the control units means to measure circuit parameters of the power converter further comprises means to measure the voltage across the bulk capacitor.

6. A power converter as claimed in claim 5 in which the control unit has means to exaggerate the response to a dip in the voltage across the bulk capacitor in order to increase the voltage across the bulk capacitor in as short a time period possible.

7. A power converter as claimed in claim 5 in which the control unit further comprises a comparator for comparing the measured-value of bulk capacitor voltage against a threshold value of bulk capacitor voltage, and on the measured value falling below the threshold value, additional current is supplied to the bulk capacitor.

8. A power converter as claimed in claim 7 in which the threshold value of bulk capacitor voltage is a voltage below the low-point associated with normal full load ripple voltage.

9. A power converter as claimed in claim 1 in which the control units means to measure circuit parameters of the power converter further comprises means to measure the current in the isolation stage output.

10. A power converter as claimed in claim 9 in which the means to cause the buck PFC circuit to provide additional line current to the bulk capacitor comprises providing a feedforward signal, in response to the measured value of current in the isolation stage output, to adjust the amount of line current fed to the bulk capacitor.

11. A power converter as claimed in 9 in which the control unit further comprises a delay network.

12. A power converter as claimed in 11 in which the delay network further comprises a low pass filter.

13. A power converter as claimed in claim 9 in which the control unit is provided with timing adjustment to reduce line current distortion.

14. A power converter as claimed in claim 2 in which the control units means to measure circuit parameters of the power converter further comprises means to measure the voltage across the bulk capacitor.

15. A power converter as claimed in claim 6 in which the control unit further comprises a comparator for comparing the measured-value of bulk capacitor voltage against a threshold value of bulk capacitor voltage, and on the measured value falling below the threshold value, additional current is supplied to the bulk capacitor.

16. A power converter as claimed in claim 2 in which the control units means to measure circuit parameters of the power converter further comprises means to measure the current in the isolation stage output.

17. A power converter as claimed in claim 3 in which the control units means to measure circuit parameters of the power converter further comprises means to measure the current in the isolation stage output.

18. A power converter as claimed in claim 10 in which the control unit is provided with timing adjustment to reduce line current distortion.

* * * * *